Feb. 27, 1962   J. H. JONES   3,023,318
OPTICAL SWITCHING
Filed Jan. 27, 1960
2 Sheets-Sheet 1
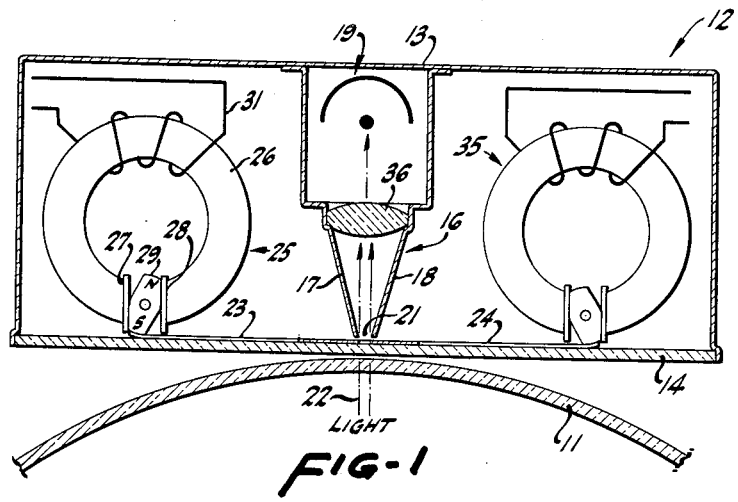
FIG-1
FIG-2
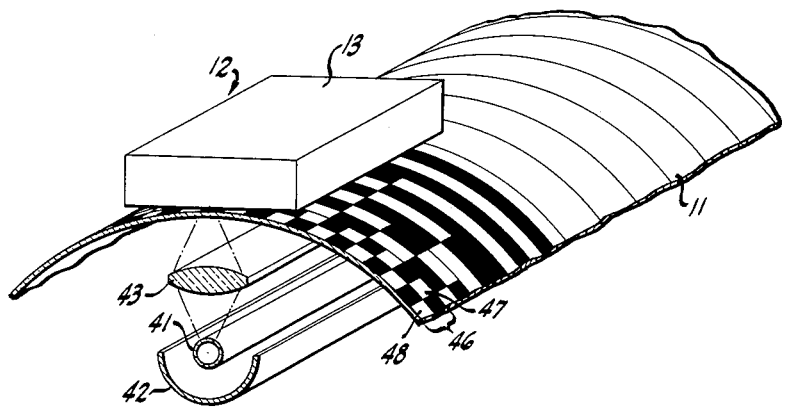
INVENTOR.
JOHN H. JONES
BY
Lippincott, Ralls & Hendricson
ATTORNEYS Feb. 27, 1962 J. H. JONES 3,023,318
OPTICAL SWITCHING
Filed Jan. 27, 1960 2 Sheets-Sheet 2
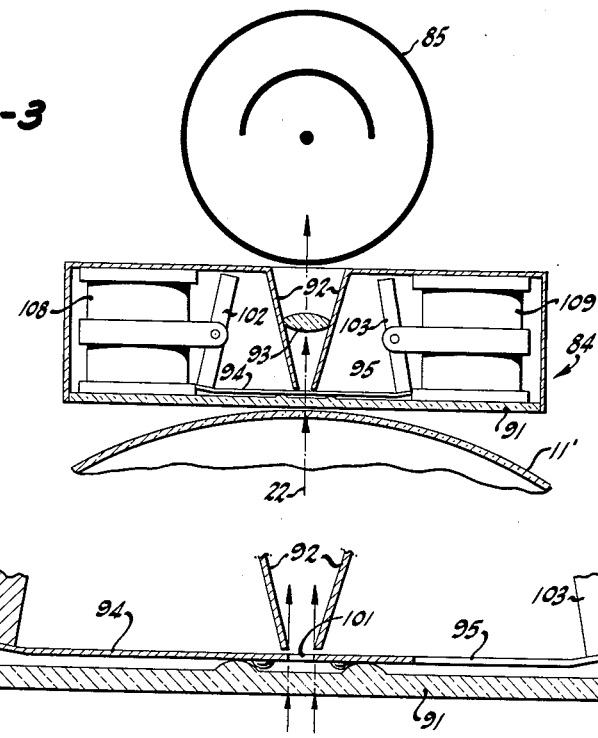
FIG-3
FIG-4
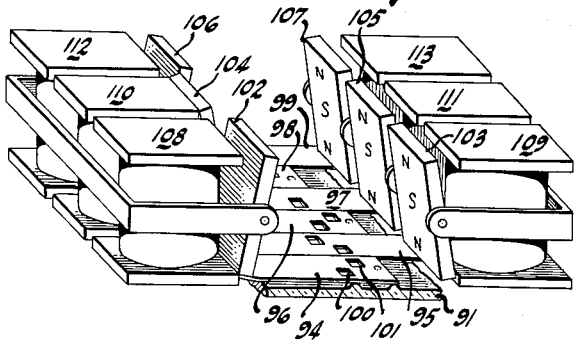
FIG-5
INVENTOR.
JOHN H. JONES
BY
Lippincott, Ralls & Hendricson
ATTORNEYS

United States Patent Office 3,023,318
Patented Feb. 27, 1962

3,023,318
OPTICAL SWITCHING
John H. Jones, 10620 Loyola Drive, Los Altos, Calif.
Filed Jan. 27, 1960, Ser. No. 5,042
8 Claims. (Cl. 250—237)

The present invention relates to an improvement in optical switching, and more particularly, to a device adapted to switch light paths in distinction to more conventional electrical switching apparatus. The optical switching hereof is particularly adapted to control applications and also to the direct presentation of coded information.

The present patent application is a continuation-in-part of my prior copending patent application Serial No. 700,160, filed December 2, 1957, for Electrical Signalling Receiving for Displaying Lines of Characters and now Patent No. 2,949,599. Although the optical switching of the present invention is not limited to any particular application, one specific and highly advantageous utilization of the present invention is found in the apparatus disclosed and claimed in my above-noted copending patent application. With respect to this type of application of the present invention, the optical switch hereof provides a very substantial simplification of required circuitry, and a great improvement in the flexibility of the overall apparatus. The present invention is also advantageous in the direct display of information, particularly where a large quantity of information is involved, and wherein it is desired to provide indications of the type, quantity, or other characteristics thereof.

Further with regard to the utility and advantages of the present invention, same is particularly adapted for utilization as a comparative device, which may, for example, be employed for error checking in the transmission or display of coded signals. It is conventional in various fields wherein electrical signals are coded, transmitted, stored, and otherwise operated upon, to provide for rejecting or correcting erroneous codes prior to read-out or display thereof. Thus, for example, in the field of computers there is preferably provided error detection or error correction means, and in various applications there are employed particular codes for this purpose, wherein extra bits of information are provided for error checking in some manner.

The present invention is well adapted to any of the foregoing illustrative applications, for the invention hereof includes, in brief, masking means, movable in response to received electrical signals into different positions for selectively transmitting light to responsive means, such as a photocell. Also included is an optical commuter having thereon commuting tracks with light-transmissive and light-obstructive sections so as to thereby controllably provide light signals to the light-responsive means from a light source, as passed through the optical commuter and selectively-positioned masking means. Electrical signal derived from the light-responsive means may be employed for control purposes, or such other circuit application as may be desired.

It is an object of the present invention to provide an improved positive-acting optical switch.

It is another object of the present invention to provide light-switching apparatus for the comparison of two or more values or bits of information by the cooperating of a movable optical commuter, with controllably operated light masks.

Various other possible objects and advantages of the present invention will become apparent to those skilled in the art, from the following description of particular preferred embodiments of this invention; however, no limitation is intended by the terms of the following description, and instead, reference is made to the appended claims for a precise delineation of the true scope of this invention.

The invention is illustrated in the accompanying drawings, wherein:

FIG. 1 is a schematic illustration of a light switch, in accordance with the present invention, and showing particular actuating elements for the light masks thereof;

FIG. 2 is a partial perspective view of the optical switch hereof, particularly illustrating the relationship of the optical commuter;

FIG. 3 is a transverse sectional view through the operative portions of the optical switch hereof and showing alternative actuating structure;

FIG. 4 is a partial sectional view of the central portion of the switch illustrated in FIG. 3, and showing the light opening therein;

FIG. 5 is a perspective view of the light control mechanism of the optical switch and including the optical masks and actuating mechanism therefor.

Considering now the present invention in some detail, and referring first to FIG. 1 of the drawings, there will be seen to be illustrated in part a transparent drum 11 which is adapted to rotate past the optical switch 12, and which may have formed on the surface thereof a plurality of commuting tracks, as discussed in more detail below. The optical switch, illustrated in FIG. 1, includes an envelope 13 having a light-transparent floor, or undersurface 14, disposed closely adjacent the rotating drum 11. Within this envelope 13 there is mounted a light passage or chimney 16 formed of oppositely-disposed, outwardly-slanting vanes 17 and 18, which terminate immediately above the lower transparent floor of the envelope, and which extend upwardly toward and in encompassing relationship with light-responsive means 19. The light chimney 16 has the side vanes 17 and 18 thereof disposed closely adjacent each other at the lower surface of the envelope, to thereby define a narrow elongated slot 21, through which light may be transmitted as indicated by the arrows 22, from a light source disposed interiorly of the drum 11. Provision is herein made for selectively masking and unmasking portions of the light chimney slot 21, and to this end there are provided a plurality of light-opaque masks or strips 23 and 24, hereinafter denominated as "shoes." Each of these shoes is provided with apertures therethrough, and are mounted for translation upon the light-transparent floor 14 of the envelope so as to controllably dispose the shoe opening in alinement with the slot 21, or out of alinement therewith, in response to the receipt of particular electrical signals to the optical switch. The shoes may be disposed side-by-side or in stacked array depending in part upon the particular results desired. Actuation of the shoe 23 may be provided by an actuating element 25 including a magnetic core 26 having, for example, a generally circular configuration with an opening at the bottom thereof, within which there are fitted a pair of pole faces 27 and 28. Within the opening between the pole faces of the magnet core 26, there is pivotally mounted a magnetic armature 29 which may be formed of a magnetic material with opposite magnetic poles at opposite ends thereof. This magnetic armature 29 is pivotally engaged with the shoe 23 as, for example, by a depending lug at the lower surface of the armature fitting within a slot in the shoe 23. A winding 31 about the magnetic core 26 is adapted for energization with electrical currents of controllably different polarities, so as to thereby operate to pivot the magnetic armature 29 in accordance with the direction of magnetic flux induced in the core 26. With the shoe 23 attached to the magnetic armature 29, it will be seen that the shoe is thus translated in accordance with movement of the armature, so as to thereby dispose the shoe in one of two separate positions in relation to the light passage or slot 21. The shoe 23 may be provided with openings therethrough, and in the particular embodiment of the invention illustrated, each of the shoes may have two openings which are offset longitudinally of the shoe with respect to each other, and also laterally of the shoe, so as to thereby cooperate with coded bands which may be provided upon the drum 11, as noted below.

In addition to the actuating element 25, there may also be provided additional actuating elements such as, for example, the element 35 illustrated upon the opposite side of the envelope, and including substantially the same parts as those described above in connection with element 25. The illustrating actuating element 35 may engage and operate a shoe or mask 24, so as to thereby controllably move this latter member in relation to the light passage or slot 21 leading to the light-responsive means 19. In order for signals applied to actuating elements on opposite sides of the light passage to have the same sense it is only necessary to provide a polarity reversal between the sides, either electrical or magnetic.

It will be appreciated that controllable movement of the masks or shoes 23 and 24 by the actuating elements 25 and 35, will serve to selectively open and close particular longitudinal portions of the light slit 21, and there may herein be provided a lens 36 in the light chimney 16 for focusing light admitted through the light slit 21 upon the light-responsive means 19. This latter means may, for example, comprise a conventional photocell, which will then serve to produce electrical signals in response to the application of light thereto. By the impression of control signals upon the windings of the actuating elements, the masks are moved to orient different portions thereof over the slit 21, so as to thereby control the amount of light which may pass therethrough from beneath the envelope 13. Consequently, these control signals will be seen to control the amount of light which falls upon the light-responsive means 19, and in accordance therewith, there are produced electrical control signals from the light-responsive means which are related to the control signal supplied to the optical switch, and to the light available at the light slit 21.

Although it is possible to employ the optical switch of the present invention with a substantially constant amount of light impinging upon the undersurface thereof, it is further possible to provide even more desirable and advantageous results by the utilization of light-control means beneath the envelope 13, and such may be advantageously incorporated into the drum 11. In this respect, attention is invited to FIG. 2 of the drawings, wherein there will be seen to be illustrated the optical switch envelope 13 in adjacent relation immediately above the drum 11. In this figure there is shown a light source 41 formed, for example, as an elongated light element within a semicircular reflector 42, which also extends longitudinally of the drum 11. Beneath the undersurface of the optical switch 13 an elongated lens 42 may be disposed above the light source 41, so that light is directed from the source onto the undersurface of the optical switch envelope 13, along the line of the light slit 21 therein. Inasmuch as light from the source 41 within the drum 11 can only reach the undersurface of the optical switch envelope through the drum itself, it is possible to employ the drum as a further light-control means. Thus, there may be provided upon the exterior or interior surface of the transparent drum 11, a plurality of bands 46 disposed circumferentially of the drum and each including, for example, a pair of adjacent tracks 47 and 48. Each of the bands represents a single "bit" of information, and in the particular embodiment illustrated, the individual tracks of each band are formed with alternately arranged light-transmissive and light-obstructing lengthwise sections, which are so disposed that each of the light-transmissive sections of each track is alongside a light-obstructive section of the other track, and vice versa.

Again with reference to this particular arrangement, the individual masks or shoes of the optical switch are provided with two apertures each, and there is provided one shoe for each band upon the drum. More specifically, the width of each shoe of the optical switch is equal to the width of a band upon the drum 11, and the two apertures in each shoe are offset laterally of the shoes so as to aline with the separate tracks of the band passing beneath the shoe. The apertures are also offset longitudinally of the shoe so that only one aperture is alined with the light slit 21 in the chimney 16 at any particular setting of the shoe. With this arrangement, it is possible to provide for the comparison of a plurality of values wherein one set of values are provided by the control signals and the other corresponds to the information bits upon the drum 11, which is rotated so as to pass the bands thereof beneath the optical switch envelope, and to thereby successively orient light-obstructive and light-transmission portions of the individual band tracks beneath the separate masks of the optical switch.

For one particular application of this apparatus, the light-responsive means 19 may be connected to produce a control signal upon the total absence of light impinging thereon, while for other application the member 19, such as a photocell, may produce graded signals proportional to the amount of light impinging upon the photocell. As to one particular application of the optical switch hereinabove described, reference is made to my above-noted copending patent application, wherein this optical switch is employed for control purposes and, more specifically, as an error checker or comparative device in a signalling receiver. As above noted, the optical switch hereof is well adapted for use in error detection or error correction, and there may be employed therewith particular codes involving the use of extra bits of information for error checking in a variety of different manners. There may, for example, be employed a "parity bit" which, in the binary system, may be made a "1" if there is an odd number of ones in the main code, or a "0," if there are an even number of ones in the main code. Thus the entire code, including this parity bit, will always have an even number of ones. Failure of the entire code to provide an even number of ones will cause the receiving equipment to reject the code as being in error. It is also possible, with the optical switch of the present invention, to employ error correction codes such as, for example, a seven bit code, which might be used to transmit a set of sixteen desired numbers. This so-called perfect code, and others like it, are quite readily handled by apparatus of the present invention, and the receipt of either the certain code or any code differing from it in not more than a specified number of bit positions will denote a given number of the desired set of signals. Even if a perfect code is not available for the particular application desired, it is possible to employ the present invention for approximations. Thus, by setting a comparison threshold in a detector associated with the light-responsive means hereof to trigger at a particular level of signal, it is possible to correctly interpret various error-correction codes. Even in those instances wherein imperfect codes are employed, the present invention is adapted for utilization in providing what may be termed a "guess" or approximation of error correction.

With the particular illustrated configuration or embodiment of the optical switch above described, it will be seen that each of the actuating elements has a square hysteresis loop characteristic with the loop area representing the energy required to move the magnetic armatures. Consequently, these elements act as magnetic-core storage elements, insofar as circuit design is concerned, and although such an element may respond more slowly than an ordinary core, it has been found that same will respond satisfactorily to an energy pulse which is much shorter than its total mechanical action time.

Various structural modifications of the present invention may be incorporated therein, and in this respect attention is invited to FIGS. 3 to 5 of the drawings. There are illustrated in FIGS. 3 to 5 the structural details of a preferred embodiment of a single, electro-optical comparator, particularly adapted for utilization in electrical signalling receiver for the displaying of lines of character, such as comprises the invention disclosed and claimed in my above-noted copending patent application. A single comparator 84 is shown in conjunction with a commuter drum 11. A suitable light source within this drum produces light, as indicated by the arrow 22, for selective passage through light-transmissive sections of some six pairs of optical tracks carried by the drum. This light may or may not pass through the electro-optical switch 84, depending jointly upon the angular position of the drum and the switch actuating elements by received signals. Such light as is transmitted through the comparator 84 is received by a phototube 85.

Switch 84 has a transparent bottom 91, which may be a plate of glass or clear plastic. Opaque walls 92 define a light passageway or "chimney" through the electro-optical switch so that only that light which passes through a narrow reference position alined with each optical track can reach phototube 85. A small condensing lens 93 may be placed within the light chimney for focusing the light more effectively onto the cathode of the phototube. The opening at the bottom of the light chimney defined by walls 92 is sufficiently narrow that the shortest opaque section of any of the twelve tracks on drum 11′ will completely cut off light from that track to phototube 85. Thus, as drum 11′ rotates each of the twelve optical tracks alternately supplies and fails to supply light to a reference position at the bottom of switch 84.

Between transparent plate 91 and the bottom of chimney walls 92 there are six masking elements identified in the drawing by reference numbers 94 through 99. There is one of such masking elements in alinement with each pair of optical tracks on commuting drum 11′. Each of these masking elements is substantially opaque but contains two light-transmissive apertures 100 and 101, disposed in a diagonal, staggered manner, as shown. The apertures 100 and 101 are alined with respective ones of the two optical tracks comprising a respective pair of the six pairs of such tracks on commuter drum 11′. Thus, light from the first track of one pair can reach the light chimney only by passing through aperture 100, and light from the other track of the same pair can reach the same light chimney only by passing through aperture 101.

Furthermore, each masking element individually may be moved lengthwise to either of two positions. In one such position, aperture 100 is in alinement with the light chimney while aperture 101 is not, so that light from the first track only of the corresponding pair on drum 11′ can reach phototube 85. In the other position of the masking element, aperture 101 is alined with the light chimney while aperture 100 is not, so that light from the second one only of the corresponding pair of tracks on drum 11′ can reach phototube 85.

It is evident that there are 64 different combinations of positions of the six masking elements, and with the drum 11 constituted as illustrated in FIG. 2, there are provided for each such combination of positions, a different one of 64 different angular positions of drum 11, at which no light will reach the phototube 85. By suitable electrical connection of the phototube 85 to supply an electric pulse for control or other purposes at such times as no light reaches the phototube, it will be seen that there are provided output signals from the phototube at any one of 64 different epochs, selectively, in the rotational cycle of drum 11.

Each of the masking elements 94 through 99 is connected to a respective one of six magnetic armatures, identified in the drawings by reference numerals 102 through 107. Each of these six armatures is permanently magnetized with like poles (represented by the the letter N) at opposite ends of the armature, and an opposite pole (represented by the letter S) at the center of the armature.

Six electromagnets, represented by reference numerals 108 through 113, are disposed adjacent to respective ones of the six magnetic armatures. Each of the six electromagnets can be magnetized in either magnetic polarity, selectively, as by applying to the windings thereof a positive pulse or a negative pulse. Alternatively, each electromagnet may be provided with a split winding, such that current pulses of like polarity can be applied to either half of the windings, selectively, for magnetizing the electromagnet in either polarity, selectively.

It will be seen that magnetization of any one of the six electromagnets in one polarity will cause the adjacent armature to move a corresponding one of the six masking elements to one of its two positions, and that magnetization of the same electromagnet in the opposite polarity will cause the same armature to move the same masking element to the other of its two positions. To insure that a masking element will remain in the same position between pulses applied to its control electromagnet, any suitable holding means may be provided, such as small dimples in the masking elements cooperating with ridges in the plate 91, as illustrated in FIG. 4. It will thus be seen that either mechanical or magnetic detent means may be provided for holding purposes.

The optical switch of the present invention will be seen to be particularly adapted for the comparison of values, and to be highly suited to various utilities including those of error checking and error correction. In the transmission or display of coded information, there may be attained a material decrease in circuit complexity through the utilization of the present invention, for it is possible by the use of this invention to accomplish the functions of a large quantity of electrical components, without the necessity of actually employing same.

In addition to the above specifically-reference application of the present invention, various other uses thereof may be apparent to those skilled in the art. In particular is the present invention desirable in connection with those applications wherein large quantities of information must be very rapidly scanned and portions of particular interest identified for further consideration. In this respect, the optical switch of the present invention may be directly employed without the utilization of light-sensitive means other than the eye of one served by the apparatus. An example of the foregoing may arise in connection with the receipt at a single installation of a large plurality of radio signals appearing, for example, upon a considerable number of separate channels. It is manifestly impossible for a single person to simultaneously monitor such information, and yet it may be necessary for such person to obtain particular important information which exists along the mass of incoming data. Through the utilization of appropriate codes which may be removably applied to the rotary drum of the present invention, and through the application of suitable control signals to the actuating means of the masking elements of the switch, it is possible to provide as upon a screen, suitable variations in light intensity indicative of the average importance of particular intelligence provided upon various radio channels, for example. In this relation, it is also possible to employ color as an aid to identification of the presence of suitable quantities of valuable information at particular locations or in certain channels of communication.

Thus, for example, the present invention may be readily used for information summarization and display, and also for recording of such display. In a relatively simple manner, it is possible to provide for scanning of the light passage of the optical switch hereof, as by the provision of a rotating polyhedral mirror, which may then cast an image of such path upon a viewing screen. By the utilization of appropriate coding upon the rotary drum 11, as by means of the bands thereon, and by the application of suitable control signals to the actuating means for the shutter of the optical switch, it will be seen that there would be displayed upon a screen an elongated line, or the like, wherein a dark band could indicate an area of particular interest and the location of such bands upon the line could, for example, suggest priority. Such an application of the present invention would provide an easily extracted first summarization from which a viewer could decide upon particular areas within which he should seek to personally assimilate information. Such summarizations would then provide for aiding the operator or viewer in choosing the proper areas within which human capabilities could be best applied to consequently assimilate a maximum amount of the most important information provided.

It will be appreciated that the foregoing is merely one isolated example of possible utility of the present invention, and is herein suggested merely as an indication that the optical switch hereof has wide applicability, and furthermore, is not limited to the utilization of purely electronic read-out or display means. The switch itself may be directly employed to provide information to a viewer, as contrasted to the first-mentioned application of the present invention, wherein the optical switch hereof is utilized as a component in overall apparatus providing direct visual display of information.

What is claimed is:

1. An improved optical switch comprising means defining a light passage, a light source, means carrying a plurality of coded bands between said light source and light passage with segmented light-opaque and light-transmissive portions upon said bands, a plurality of independently movable light-opaque masks each having a pair of light-transmissive portions therein disposed in closing relation to said light passage, and separately operable actuating means engaging each of said masks for controllably moving some in response to received electrical signals whereby light transmitted through said light passage is representative of the instantaneous relative opacity of coded bands and masks in the path of light through said passage.

2. An improved optical switch comprising light-responsive means displaced along a light passage from a slot, a plurality of movable masks disposed across said slot and each having light-opaque and light-transparent portions, and actuating means connected to said masks for selectively translating same relative to said slot in response to received signals, said actuating means each including a magnetic armature connected to a mask and a coil-wound core disposed in operative relation to the armature and actuating the armature upon receipt of electrical signals energizing the coil for selectively disposing the light-transparent mask sections in said slot whereby the quantity of light transmitted through said passage is a function of said received signals and the response of said light-responsive means is governed by the received signals.

3. An improved optical switch comprising an envelope including a pair of light-opaque vanes defining a light passage from a light-transparent slit to a light-responsive means, a plurality of light-opaque masks disposed in closing relation to said slit and each having light-transparent portions therein, electrically-controlled actuating means separately engaging each of said masks for moving same relative to said slit and controllably disposing same in position to orient light-transmissive portions thereof in said slit in response to electrical signals received by said actuating means, a carrier having coded light-transparent and light-opaque portions thereon, and means moving said carrier past said slit, whereby said light-responsive means is responsive to said code and signals.

4. An improved optical switch, as defined in claim 3 further characterized by said carrier comprising a drum mounted for rotation immediately adjacent said slit with a drum wall in closing relation thereto, and a plurality of coded bands having segmented tracks of successive light-transmissive and light-opaque portions whereby light through said slit to said light-responsive means is additionally controlled by the angular position of said drum, and the light-transmissive and light-opaque coded track segments thereon.

5. An improved optical switch comprising an envelope with a light-transparent floor, a pair of light-opaque vanes extending upwardly from said floor and defining a tapered light passage from a slit between the vane edges at said floor, light-responsive means disposed in said light passage, a plurality of light-opaque shoes with light-transparent openings therein disposed upon the envelope floor in closing relation to said slit, means including a magnetic armature connected one to each of said shoes and coil means adapted for energization by control signals for actuating each of said armatures in accordance with received electrical energy to move said shoes and controllably admit light through said slit, and means carrying a plurality of coded light-transparent and light-opaque bands past said slit, whereby said light-responsive means is actuated by light of an intensity determined by said control signals and corresponding instantaneous code band position.

6. An improved optical switch comprising means defining a light passage with a slit at one end thereof, a drum mounted for rotation with the wall thereof in closing relation to said slit and carrying at least one circumferential band of coded light-opaque and light-transparent segments moving past said slit, a light source separated from said slit by the moving band of said drum, at least one mask disposed in closing relation to said slit and having light-transparent portions therein, and actuating means moving said mask relative to said slit by magnetic means energized from received signals, whereby light transmitted through said passage is related to said code and said received signals.

7. An optical switch, as set forth in claim 6 further defined by said actuating means including for each mask a pivotally mounted magnetic armature with like magnetic poles at each end thereof, said armature being secured to said mask for movement of same, and a coil disposed adjacent said armature whereby energization of said coil with signals of opposite polarity moves said mask in opposite directions.

8. Apparatus for comparing two values, comprising an optical commuter having thereon two side-by-side commuting tracks each having alternately arranged light-transmissive and light-obstructing lengthwise sections substantially so disposed that each of said light-transmissive sections of each track is alongside a light-obstructive section of the other track and vice versa, said commuter being movable in a lengthwise direction of said tracks relative to two side-by-side reference positions for causing each of said sections in succession of each track to pass through a respective one of said reference positions, whereby each of said reference positions, selectively, may be occupied by a light-transmissive one of said sections while simultaneously the other of said reference positions is occupied by a light-obstructive one of said sections, means for supplying light to said two reference positions, said light being transmitted by a light-transmissive section and obstructed by a light-obstructive section, whereby motion of said commuter commutes the transmission of light from one to the other of said tracks, a light-sensitive transducer disposed to receive the light so transmitted, a masking element movable to two different positions selectively, said element in each of said positions permitting such transmission of light from said means for supplying light to said transducer by way of a selected one of said tracks while blocking such transmission by way of the other of said tracks, said selected track being either of said two tracks, selectively, depending upon the position of said masking element, electromagnetic means for positioning said masking element in either of its two positions, selectively, responsive to one of said two values that are to be compared, and means for positioning said commuter in a lengthwise direction of said tracks relative to said reference position responsive to the other of said two values, whereby said transducer responds to a relation between said two values.

References Cited in the file of this patent

UNITED STATES PATENTS

| | | |
|---|---|---|
| 2,160,603 | Sagebeer | May 30, 1939 |
| 2,207,343 | Fairchild | July 9, 1940 |
| 2,482,242 | Brustman | Sept. 20, 1949 |
| 2,769,922 | Peery | Nov. 6, 1956 |
| 2,921,204 | Hastings et al. | Jan. 12, 1960 |
| 2,949,599 | Jones | Aug. 16, 1960 |